United States Patent [19]
Loderer

[11] 3,930,191
[45] Dec. 30, 1975

[54] BRAKING CIRCUIT FOR THE MIXED REGENERATIVE AND RESISTANCE BRAKING OF A D-C SERIES MACHINE OPERATED AS A GENERATOR

[75] Inventor: Peter Loderer, Erlangen, Germany

[73] Assignee: Siemens Aktiengesellschaft, Munich, Germany

[22] Filed: June 3, 1974

[21] Appl. No.: 475,992

[30] Foreign Application Priority Data
June 7, 1973 Germany............................ 2329146

[52] U.S. Cl.................................. 318/376; 318/380
[51] Int. Cl.²........................................... H02P 3/14
[58] Field of Search ............ 318/370, 376, 378, 380

[56] References Cited
UNITED STATES PATENTS

| | | | |
|---|---|---|---|
| 3,577,055 | 5/1971 | Hermansson | 318/376 X |
| 3,593,089 | 7/1971 | Appelo | 318/376 X |
| 3,611,092 | 10/1971 | Wilmunder | 318/380 X |
| 3,657,625 | 4/1972 | Miller et al. | 318/370 |

Primary Examiner—G. Z. Rubinson
Attorney, Agent, or Firm—Kenyon & Kenyon Reilly Carr & Chapin

[57] ABSTRACT

An improved braking circuit for the mixed regenerative and resistance braking of a d-c series machine operating as a generator, the braking circuit comprising essentially a d-c control element across the series machine and in parallel therewith two controlled braking branches with control means provided to selectively activate one or both of the braking branches to thereby effectively establish three different control ranges.

11 Claims, 4 Drawing Figures

BRAKING CIRCUIT FOR THE MIXED REGENERATIVE AND RESISTANCE BRAKING OF A D-C SERIES MACHINE OPERATED AS A GENERATOR

BACKGROUND OF THE INVENTION

This invention relates to the braking of d-c series machines operating as generators in general, and more particularly to an improved circuit for the mixed regenerative and resistance braking of such machines.

Circuits for the mixed regenerative and resistance braking of d-c series machine operating as a generator in which a stabilizing resistor is in series with the armature and field winding of the motor and in which a d-c control element with a main controlled rectifier is shunted across this series combination and additionally in parallel therewith a braking branch including a braking resistor in series with a controlled rectifier is placed and furthermore which includes a return uncontrolled rectifier for returning energy from the series machine to the source at least intermitently are known. Arrangements of this nature are particularly useful in electric vehicles such as electric trains, trolleys or subways. Through this arrangement, regenerative braking in which the braking energy is returned to the d-c system becomes possible. These systems such as subway and trolley car lines may be supplied from a d-c overhead system or a third rail. Typical of such systems are those disclosed in Elektrische Bahnen, vol. 40, no. 7, pages 148 to 155 [1969]. In view of the present energy situation, it is essential that regenerative braking be used in short-haul vehicles of this nature to the greatest degree possible. By doing so, the kinetic energy of the moving vehicle which must be dissapated during braking is converted into electrical energy and fed back into the d-c system where it may be used by other vehicles being supplied thereby. Such is suggested in ETZ-A, vol. 90, no. 26, pages 700 to 703 [1969]. However, purely regenerative braking is possible only where the entire amount of braking energy generated can be absorbed during the braking process by the d-c source. Such is always the case in a battery driven vehicle. However, systems of this nature will generally be more applicable to vehicles fed by a d-c system either overhead or third rail. In such systems, it is customary to provide d-c sub-stations which are connected to a three-phase system through appropriate rectifier arrangements. The d-c substations then supply the d-c system used to supply energy to the vehicles. Normally, the rectifying arrangement comprises simple diodes and energy cannot be fed back into the a-c system. As a result, any energy generated during braking must be absorbed by other vehicles being fed by the same system. Clearly, their ability to do so will depend upon their state of operation which is subject to large fluctuations. As a result, the system may not always be able to absorb all energy generated during braking. As a result, it is necessary that further braking arrangements be provided in the vehicle. The simplest way of carrying out this further braking is through the use of electric resistance braking in which the energy is dissipated in a braking resistor.

Systems and circuits have been developed for the combined operation of regenerative and resistance braking within a cycle of the d-c control element associated with a series d-c machine in a vehicle. These systems operate in accordance with the capacity of the d-c system to absorb the braking current generated. With such a system, it is possible to hold the braking current and thus the braking torque at a constant time average dispite variations in the capability of the d-c system to absorb the current. Such a system is disclosed in the above reference ETZ-A, vol. 90, pages 700 to 703 [1969]. In the system disclosed therein, a voltage control circuit is provided which first switches to regenerative braking for as long as the system can absorb the current. A storage capacitor is applied across the line and if the voltage stored in this capacitor rises because of braking energy being supplied by the d-c series machine in excess of that which can be absorbed, i.e., if it exceeds over a predetermined voltage limit, the resistance braking arrangement is automatically switched on to absorb the braking energy. Because of the cyclic nature of the system, braking through the braking resistor takes place only until the d-c system is again capable of absorbing the braking current. The kinetic energy of the vehicle which cannot be absorbed by the d-c system is converted into heat in the braking resistor. The system of this nature thereby achieves a mixed regenerative and resisting braking operation in which a considerable portion of the braking energy produced is returned to the d-c system while at the same time insuring through resistance braking that any energy which cannot be absorbed will be converted to heat in a braking resistor thereby maintaining adequate braking of the vehicle. As noted above, a braking circuit of this nature is disclosed in the above ETZ-A reference, particularly on FIG. 1c thereof. Another similar arrangement is disclosed in German Offenlegungsschrift No. 2,057,440. Typically, a d-c series machine is used which has a generator voltage which is higher at maximum speed and maximum braking current than the predetermined maximum voltage allowable at a storage capacitor connected across the input from the d-c system. Under these conditions, the braking circuit must include a stabilizing resistor which, in order to prevent unstable operation, is placed in series with the d-c machine. Operation would be unstable if the generator voltage E furnished by the d-c series machine operating as a generator became larger than the minimum voltage $U_{Cmin}$ at the storage capacitor. Under these conditions, the d-c control element could no longer be used to influence the magnitude of the braking or armature current I. Through the insertion of an appropriately selected stabilizing resistor between the d-c system supplying voltage and the d-c series machine, the following stabilization condition is achieved:

$$E \leq U_{Cmin} + I \cdot R_S \qquad (1)$$

This condition is then fulfilled in the entire range $I_{min} \leq I \leq I_{max}$ where $I$ is the armature current. In this equation, $R_S$ is the resistance of the stabilizing resistor, $I_{min}$, a predetermined minimum value which may be zero and $I_{max}$ a predetermined maximum value of armature current.

Previously developed braking circuits having a stabilizing resistor have an advantage over other prior art braking circuits in that they contain only a single d-c control element. No separate quenching arrangement need be provided for the controlled braking rectifier. However, to gain this simplicity of construction, a price must be paid. Heat is dissipated in the stabilizing resistor not only during resistance braking, but also when braking current is being supplied to the d-c overhead system, i.e., also during regenerative braking. Obviously, dissipation of heat under these conditions is undesirable. Aside from the fact that the maximum amount of energy is not fed back to the d-c system, if the vehicle is operating underground, i.e., if it is a subway, an increase in tunnel temperature occurs. Clearly then, it is essential that the heat dissipaation in the stabilizing resistor be kept as low as possible.

This requirement can be met without significant difficulty by selecting the resistance value $R_S$ of the stabilizing resistor to be a minimum value $R'_S$ which just meets the stability condition of equation (1). This becomes clear when it is recognized that during regenerative braking, the d-c series machine operating as a generator feeds energy back into the overhead system only through the stabilizing resistor. The resistance of the supply leads cannot be influenced. In order to obtain optimum regenerative operating efficiency, i.e., to return as much energy as possible to the d-c system, the resistance $R_S$ of the stabilizing resistor must be as small as possible. Were this the only consideration, there would be little problem. However, there is another opposed consideration which must be fulfilled. During resistance braking, the d-c series machine operating as a generator operates into the total braking resistance formed by the stabilizing resistor in series with the braking resistor. The resistance $R_{SB}$ of the total braking resistance path is as follows:

$$R_{SB} = R_S + R_B,$$

(2)

where $R_S$ is the resistance of the stabilizing resistor and $R_B$ the value of the braking resistance. In this series circuit made up of these two resistances, the braking energy is converted into heat during resistance braking. When operating with mixed regenerative and resistance braking, it is important that attention be paid to the relationship between these two types of operation. That is, for each stable operating point of regenerative braking, there should be a corresponding stable operating point for resistance braking since transition from one mode of operation to the other can occur at any time. If this is not the case, a jump in the braking torque will occur during such a transition, particularly at high speed and at small braking currents. Thus, in order to assure even braking without jolts and thus, without steps going from regenerative to resistance braking, it is necessary that the possibility exist for maintaining a small braking current flow through the braking resistances. However, such can be achieved only with a large resistance value for $R_{SB}$ the total braking resistance. Since, according to the factors noted above, it is desirable that the resistance $R_S$ be as small as possible, this requires a large value for the resistance $R_B$ in the braking branch. The resistance $R_B$ however, has an upper limit resulting from an additional condition. For a voltage drop $R_B \cdot I_{max}$ at the braking resistor when maximum braking current $I_{max}$ is flowing must not exceed the lowest voltage $U_{Cmin}$ at the storage capacitor. This condition can be expressed as follows:

$$R_B \leq U_{Cmin}/I_{max}$$

(3)

Thus, a resistance of $R_B$ as large as is desired is not possible. Thus, if a large resistance is to be established, it must be through an increase of the resistance $R_S$ of the stabilizing resistor. This then means that to satisfy the conditions of equation (2) above, taking into consideration the relationship of equation (3), it is not possible to reach the optimal minimum value $R'_S$ determined in accordance with equation (1).

This illustrates the conflict between different requirements. For the purposes of maintaining maximum efficiency during regenerative braking, the resistance $R_S$ of the stabilizing resistor should be as small as possible. However, to obtain a small braking torque during resistance braking operation, a large resistance $R_S$ greatly exceeding that of the optimal minimum value thereof, must be used.

Thus, it can be seen that there is a need for a braking circuit which can overcome this difficulty and provide maximum efficiency during regenerative braking while at the same time providing a small braking torque as required for resistance braking operations.

SUMMARY OF THE INVENTION

The present invention provides such a circuit. It is first based on the fact that the two seemingly incompatible conditions mentioned above can be fulfilled through a circuit such as that described above when applied to a d-c series machine with what is referred to as a high type point. A d-c series machine of this nature exist if the ratio of the generator voltage at maximum speed and maximum braking current to the minimum line voltage is not appreciably greater than one but in the interest of high efficiency is always below two.

The problem is solved in the present invention by using at least two parallel braking branches. The braking branch common in the prior art and comprising a resistance and controlled rectifier is shunted by a further braking branch similarly comprising a second resistor and second controlled rectifier. With this arrangement, the resistance $R_S$ of the stabilizing resistor can be made to be only as large as is necessary for stability. In other words, it can have the value $R'_S$ found in accordance with the stability equation (1) above. Despite making the resistance $R_S$ as small as possible, it is still within the capability of the present circuit to obtain the minimum required braking current in resistance braking operations. This is true since, through the use of two braking resistances, one can have a large resistance and therefor be used to establish the minimum braking current $I_{min}$, and the other braking resistance be designed so that the parallel combination of the two shunting resistors when both placed in the circuit permits a predetermined maximum braking current $I_{max}$.

It is possible to make both braking resistances equal. By doing so, two operating regions are established. One determined by the common resistance value and the other by the value of the two resistances in parallel. However, it is more advantageous to choose resistances of different values. This then permits three operating regions. That is, each resistance by itself establishes an operating region and their parallel combination a further operating region. Although any kind of semiconductor switch such as a transistor can be used as the controlled rectifier or switch in the braking branches, it is preferable that thyristors be used. As noted above, in an arrangement of this nature, they will be extinguished each cycle by the quenching device of the installed d-c control element with no additional quenching arrangement required.

When operating with a small braking current, only one of the two controlled rectifiers or switches is fired or closed, causing only one resistance branch to be placed in the circuit with operation then taking place in a first operating region. In the preferred case where the two resistances are different, it will be the larger resistance which is switched in. Then, for larger braking currents, the other of the resistors can be switched in alone to cause operation in a second operating region. Finally, in a type of operation with still larger braking currents up to the maximum current $I_{max}$, both braking branches are closed by firing their associated thyristors or closing switches so that the parallel combination of the two braking resistors becomes effective.

DETAILED DESCRIPTION OF THE PREFERRED EMBODIMENT

Figure 1:
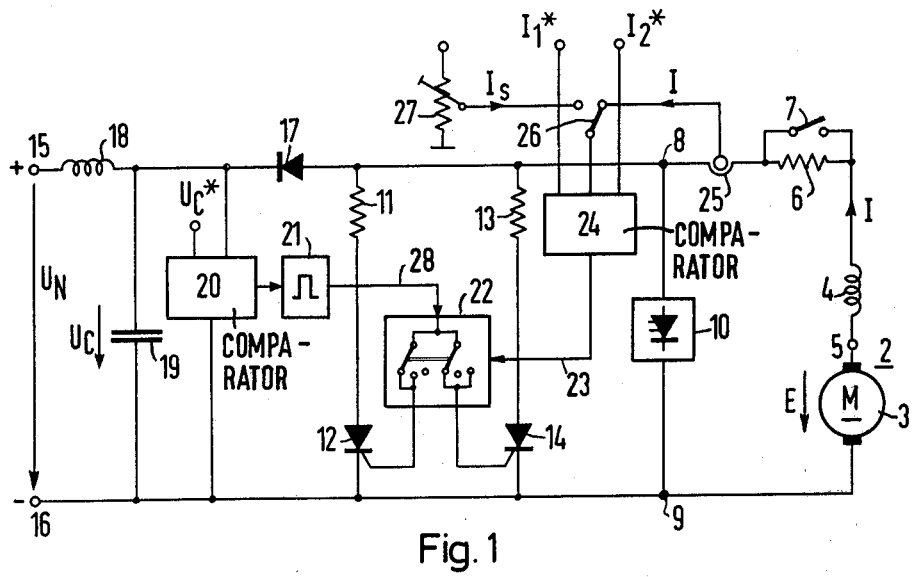
FIG. 1 is a circuit diagram of a preferred embodiment of the braking circuit of the present invention.

FIG. 1 is a circuit diagram illustrating a braking circuit according to the present invention, useful for mixed regenerative and resistance braking. Its operation will be explained primarily in conjunction with its use in a self-propelled vehicle such as a trolley or subway operated from a d-c system having either overhead wires or a third rail. It should be noted, however, that the circuit of the present invention may also be used in a self-propelled vehicle having power supplied from an onboard battery. It is well known that vehicles of this nature have a travel-brake control lever which can be switched between a travel or drive position and a brake position and which lever is arranged such that it rearranges the circuits associated with the series d-c machine for either motor or generator operation, i.e., either driving or braking operation. This lever and its associated contactors are not illustrated on FIG. 1, the assumption being made that the lever has been put in the braking position and configured the circuit as shown thereon. During braking operation, because of the motion of the vehicle, the d-c series machine 2 which is coupled to the drive axle of the vehicle will be acting as a generator. As illustrated, the motor 2 includes an armature 3 and a field winding 4 in series therewith. This series machine converts the kinetic energy of the self-propelled vehicle into electrical energy. A generator voltage E will appear at the armature winding 3. In series with the series connected d-c machine 2 is a stabilizing resistor 6 having a switch 7 placed across it for shorting it out. Preferably, this switch will be a contactor.

in parallel with this series circuit made up of the armature and field winding of the d-c machine and the stabilizing resistor 6 is a conventional d-c control element 10 referred to as the main branch. As shown, it is connected between the points 8 and 9 and will comprise essentially a main controlled rectifier such as a thyristor and a quenching arrangement customary in this type device. Details of such an arrangement are disclosed in German Pat. No. 1,242,289. Since this portion of the system is well known to those skilled in the art, it will not be described in detail herein.

Also connected in parallel with the main branch is a first braking branch made up of a braking resistor 11 and a controlled rectifier 12. Furthermore, similarly connected in parallel is a second braking branch made up of braking resistor 13 and controlled rectifier 14. Controlled rectifiers 12 and 14 will preferably be thyristors. In the preferred embodiment, the resistance $R_{B11}$ of the braking resistor 11 is larger than the resistance $R_{B13}$ of the braking resistor 13. It should be noted that the arrangement can be expanded to include further braking branches connected in parallel to further establish additional operating regions.

The connecting points 8 and 9 are connected through appropriate lines to the positive and negative terminals 15 and 16 respectively. In well known fashion, the terminal 15 will be connected to a positive current collector on the vehicle and the negative terminal similarly coupled to a negative collector such as a collector for the negative overhead wire. It will be recognized that one of the terminals may be grounded. Between the terminals 15 and 16, a line voltage $U_N$ of, for example, 600 V is present. In the line between terminal 15 and connection point 8, an uncontrolled return rectifier 17 is placed. The return rectifier 17 along with the braking rectifiers 12 and 14 have a polarity in the current flow direction of the d-c series machine 2 operating as a generator. Also in the positive line between terminal 15 and connection point 8 is a smoothing choke 18. In addition, the effect of the inductance of the overhead lines is reduced by a storage capacitor 19 connected in parallel across the input to the braking circuit. As shown, capacitor 19 is connected at the junction between the smoothing choke 18 and return rectifier 17 and to the negative line between terminal 16 and connection point 9. A comparator 20 is provided having as one input the voltage across capacitor 19. That is, it is coupled through the positive and negative line across the capacitor.

This comparator has as a reference value input a voltage $U_C^*$, a predetermined limit voltage. This voltage can be provided by a potentiometer or the like used to preset a limiting voltage into the comparator. Comparator 20 will provide an output signal if the voltage $U_C$ corresponding essentially to the line voltage $U_N$ becomes higher than the limit voltage $U_C^*$ set in. The output signal of comparator 20 is provided as an input to a firing pulse generator 21 having its output coupled to the controlled rectifiers 12 and 14 through a selection logic circuit 22. Pulse generator 21 can comprise a one-shot or the like capable of providing an appropriate output pulse for firing the thyristors 12 and 14. Circuits for firing thyristors of this nature are well known in the art and need not be described in detail herein. The selection logic circuit 22 is shown schematically on FIG. 1 and will be described in more detail below in connection with FIG. 4. In principle, it comprises a two-pole switch with three switch positions. In the switch position with the switches all the way to the right, the firing pulse will be coupled only to the thyristor 14. In the middle position it will be coupled only to the thyristor 12 and in the position shown, i.e., that to the left, it will be connected to both thyristors 12 and 14. Thus, through proper setting of the switch, it is possible to fire either thyristor alone to place either one of the braking resistors 11 and 13 into the circuit, or it may simultaneously fire both thyristors to place both resistances in the circuit in parallel. Control of the switch is indicated as being provided by a control input on line 23. This input is obtained from a comparator arrangement 24, also to be described in detail below. The comparator arrangement 24 has as inputs the actual current I obtained from a current transformer 25 through a switch 26 and as reference inputs, predetermined values designated $I_1^*$ and $I_2^*$. These values may be obtained from potentiometers or the like and preset as required. The switch 26 permits feeding into the comparator circuit a current proportional value $I_S$ rather than the value I. This value is obtained from a potentiometer or the like 27 and provides a desired value $I_S$. Such a value may also be formed in a higher order controlled loop. A potentiometer of this nature can be operated by the travel and braking control lever of the self-propelled vehicle.

With the connection shown, the actual current I is compared with desired values $I_1^*$ and $I_2^*$. In accordance with the present invention $I_1^*$ is greater than $I_2^*$. An output of comparator circuit arrangement 24 to cause the first braking resistor 11 to be switched into the circuit will be delivered as long as I is less than or equal to $I_1^*$. If $I_1^* < I \leq I_2^*$, the selection circuit 22 will be caused to go into a second switch position corresponding to the position all the way to the right to cause the resistor 13 to be in the circuit. When I is greater than $I_2^*$, the switching signal will cause the third position, i.e., the position shown on the figure in which both resistors are placed in the braking circuit.

Preferably, the braking circuit of FIG. 1 will be controlled by the pulse width control method. What this means is that the main control rectifier 10 is operated with a constant frequency and its duty cycle influenced by its "on" time. When operating in a system where a plurality of self-propelled vehicles are supplied from a common line voltage $U_N$, this control method becomes particularly advantageous in that it avoids interference with existing train signal systems using frequency sensitive devices. For this reason, the energy consumption in operations of this nature are along with the return of energy during braking is generally caused to take place at a constant frequency.

During braking operation, the connection points 8 and 9 are first shorted by the d-c control element 10 from a first point in time to a second point in time permitting the braking current I to increase. After the d-c control element 10 is cut off at a second point in time, the inductance of the d-c series machine 2 forces the braking current I to continue to flow through the return rectifier 17 and the smoothing member 18 and 19 into the system if the latter is capable of absorbing it. For determing whether or not such capability exists, the magnitude of the voltage $U_C$ at the storage capacitor 19 is sensed by the comparator 19. If its value does not exceed the predetermined limit $U_C^*$, the system is still capable of absorbing the current and there is no reason to switch in one or both of the braking resistors 11 and 13 through firing on one of the braking thyristors 12 or 14. If the system is partially capable of absorbing the generated current, the voltage $U_C$ will reach the predetermined limit $U_C^*$ at a third point in time after the switching off of the d-c control element 10. When this occurs, the comparator 20 will fire the pulse generator 21 causing it to supply a firing pulse to one or both of the thyristors 12 and 14 placing one or both of the braking resistors 11 and 13 into the circuit. The braking resistor or resistors then absorb the braking energy until the end of the cycle period when the d-c control element 10 again shorts the points 8 and 9. In order that regenerative braking is possible during the next cycle, provision must be made for the braking rectifiers 12 and 14 to again conduct in the forward direction no later than the end of the cycle period. Such will occur with the present braking circuit without any further provisions being made since during the "on" period of the d-c control element 10 the braking current I in the braking rectifier 12 is zero and afterwards a negative anode-cathode voltage appears not only at the d-c control element 10 at the end of the period during quenching, but will also appear at the braking rectifiers 12 and 14 connected in parallel therewith.

Clearly, the less braking energy the system is able to absorb, the earlier the predetermined limit $U_C^*$ will be reached, thus, the larger the share of the resistance braking operation. By determining the capacity of the system to absorb through monitoring the voltage $U_C^*$ at the storage capacitor 19, the voltage $U_C$ can never become larger than the limit $U_C^*$ and thus all equipment connected to this voltage $U_C$ is sufficiently protected. In addition, regenerative braking is used with priority as much as possible with resistance braking carried out only to the extent necessary. In addition, the braking process and a predetermined braking torque are not influenced by rapid fluctuating load conditions in the system.

In the braking circuit having two braking branches containing respective braking resistors 11 and 13 shown on FIG. 1, the characteristics of the d-c series machine have a large influence on the efficiency of the energy recovery. Such efficiency becomes higher, the higher what is referred to as the "type point" of the d-c series machine is. In a d-c series machine having what is referred to as a high type point, the line voltage $U_N$ and thus the minimum voltage $U_{Cmin}$ at the storage capacitor 19 will be, in the case of fluctuations, only a small amount below the maximum generator voltage $E_{max}$ which occurs at maximum speed $n_{max}$ and maximum braking current $I_{max}$.

Figure 2:
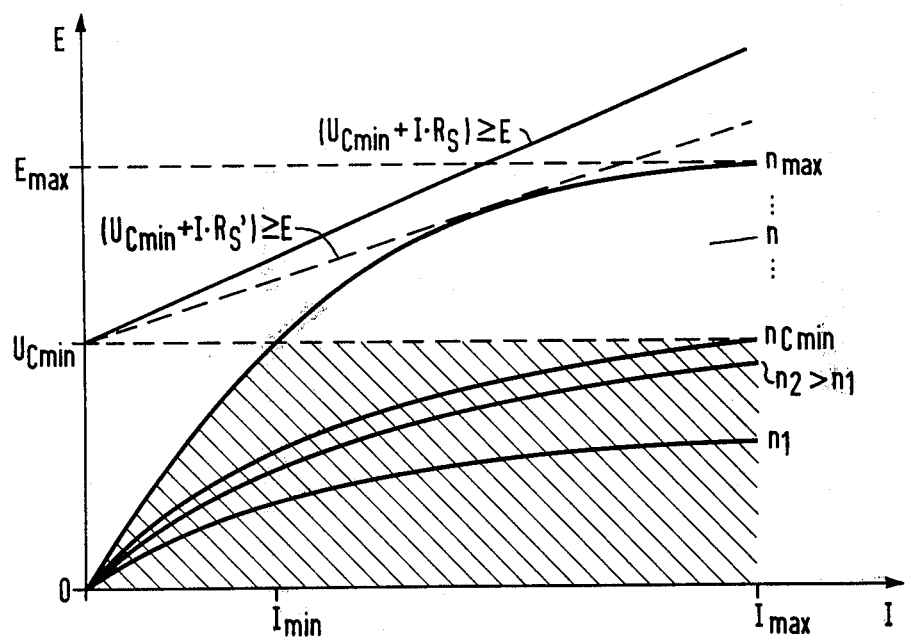
FIG. 2 is a voltage current diagram illustrating regenerative braking operation.

This is shown on FIG. 2 which shows the dependence of the generator voltage E for regenerative braking on the braking current I at different speeds $n_1, n_2 \ldots n_{max}$ of a d-c series machine 2 with a high type point. The ratio $E_{max}/U_{Cmin}$ is not appreciably greater than 1 and is, for example, 1.5, i.e., it is below the value 2. The energy recovery then takes place over a wide range of speeds $0 \leq n \leq n_{Cmin}$ almost without loss. This speed range is shown shaded. In order that any braking current I can be set as small as desired, then the resistance $R_{BS}$ of the total braking resistance of such a magnitude, as already explained in the introduction, that the stability condition of equation (1) is fulfilled over the entire braking current range $0 \leq I \leq I_{max}$. This, however, would lead to considerable expenditure for the braking resistor. It is therefor more advantageous to select a minimum braking current $I_{min}$. This minimum braking current $I_{min}$ is shown in FIG. 2. It may be, for instance, 100 A, while the maximum braking current $I_{max} = 600$ A. Practical experience has shown that by preselecting such a minimum braking current $I_{min}$ the travel comfort is not appreciably affected.

In FIG. 2, the stability condition of equation (1) is also shown in the form of a solid straight line which starts from the value $U_{Cmin}$ for the braking current $I = 0$. The resistance $R_S$ of the stabilizing resistor 6 is assumed to be somewhat larger than that corresponding to the smallest possible value $R'_S$. The stability condition of equation (1) for the minimum value $R'_S$ is also plotted on FIG. 2 as a dashed line which is tangent to $E(I, n_{max})$.

Figure 3:
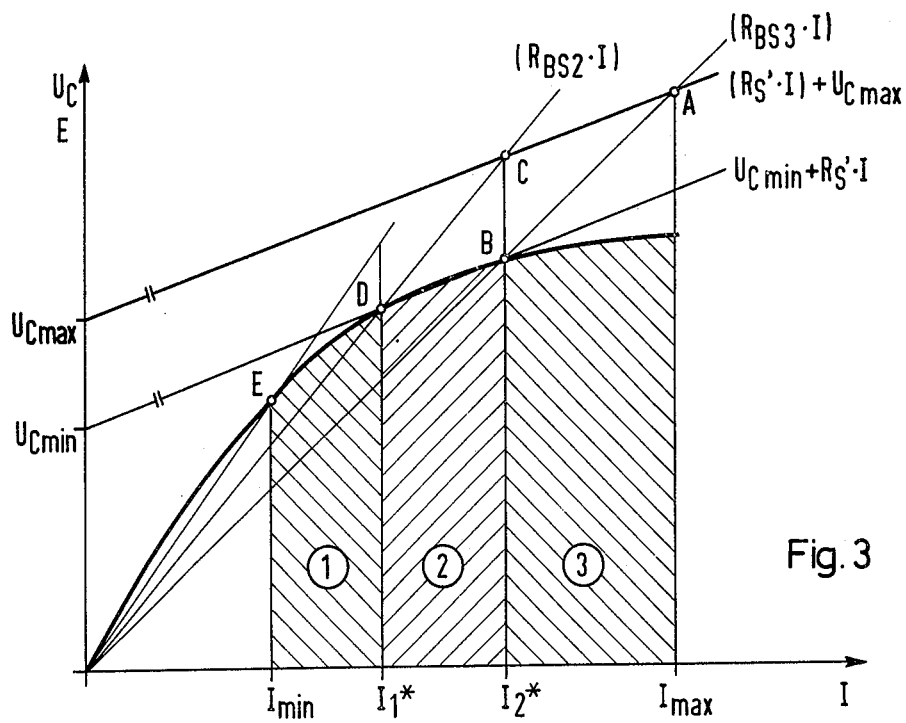
FIG. 3 is a voltage current diagram illustrating resistance braking operation.

In FIG. 3, the generator voltage E is plotted as a function of the braking current I for resistance braking. FIG. 3 shows this dependence for three speeds $n_1$, $n_2$ and $n_{max}$. As in FIG. 2, the minimum braking current $I_{min}$ and the maximum braking current $I_{max}$ are again indicated. FIG. 3 further shows that the braking circuit according to FIG. 1 has three possible operating ranges during resistance braking operation. These are shaded differently and are designated with Arabic numerals 1, 2 and 3 in circles.

In designing the braking resistors 11 and 13, one will start in practice from the maximum braking current $I_{max}$, since this value is fixed by the required braking delay, while the minimum braking current $I_{min}$ can be changed within certain limits.

In the operating region 3, both braking thyristor 12 and 14 are fired simultaneously at a braking current $I_2^*$ < I ≤ $I_{max}$. Thereby, the parallel connection of the two braking resistors 11 and 13 in series with the stabilizing resistor 6 becomes effective. The effective total braking resistance is thus $R_{BS3} = R_{B11} \cdot R_{B13}/R_{B11} + R_{B11} + R_S$. The resistance $R_S = R'_S$ is made as small as possible in this example and is shown, according to FIG. 2, by the plotted dashed staight line. The resistance of the parallel circuit of $R_{B11}$ and $R_{B13}$ is such that, for the maximum braking current $I_{max}$, the maximum voltage $U_{Cmax}$ at the storage capacitor 19 is not exceeded.

These conditions may be expressed as follows:

$$R_{B11} \cdot R_{B13}/R_{B11} + R_{B13} = U_{Cmax}/I_{max} \quad (4)$$

and $$R_{BS3} = R_{B11} \cdot R_{B13}/R_{B11} + R_{B13} + R'_S.$$

The intersection of the resistance line $U_{Cmax} + R'_S \cdot I$ with the straight line $I_{max}$ = const is designated on FIG. 3 by A. The resistance line $R_{BS3} \cdot I$ is also shown on FIG. 3. The limit predetermined for $I_2^*$ is the intersection B of the straight line $R_{BS3} \cdot I$ with the machine characteristic $E(I, n = n_{max})$.

In the operating region 2 only the braking thyristor 14 is fired with the braking current I smaller than the limit $I_2^*$. This operating region is defined by the two predetermined limits $I_1^*$ and $I_2^*$. The value $R_{B13}$ of the second braking resistor 13 is, according to the equation (4):

$$R_{B13} = U_{Cmax}/I_2^* \quad (5)$$

Furthermore: $R_{BS2} = R_{B13} + R'_S$.

The intersection of the resistance line $U_{Cmax} + R'_S \cdot I$ with the straight line $I_2$ = const is designated on FIG. 3 as C. The corresponding resistance line $R_{BS2} \cdot I$ is also drawn. The lower limit $I_1^*$ is obtained from the intersection D of the machine characteristic $E(I, n = n_{max})$ with the straight line $R_{BS2} \cdot I$.

In the operating region 1, with a small braking current I in the range $I_{min} \leq I \leq I_1^*$, only the braking thyristor 12 is fired. Thereby, the series circuit of the braking resistor 11 with the stabilizing resistor 6 becomes effective. The resistance of the braking resistor 11 is obtained from equations (4) and (5) as $$R_{B11} = U_{Cmax}/(I_{max} - I_2^*)$$

Furthermore, $R_{BS1} = R_{B11} + R'_S$. The minimum braking current possible, $I_{min}$, at the maximum speed is obtained from the intersection E of the machine characteristic $E(I, n - n_{max})$ with the resistance line $R_{BS1} \cdot I$, which is also drawn on FIG. 3.

In order that the d-c series machine 2 can be braked to very low speeds n with constant braking torque, i.e., with constant braking current I, it is necessary that the stabilizing resistor 6 be shorted either in dependence on the degree of modulation of the d-c control element 10 or in independence on the speed n. Switch 7 is provided for this purpose.

Figure 4:
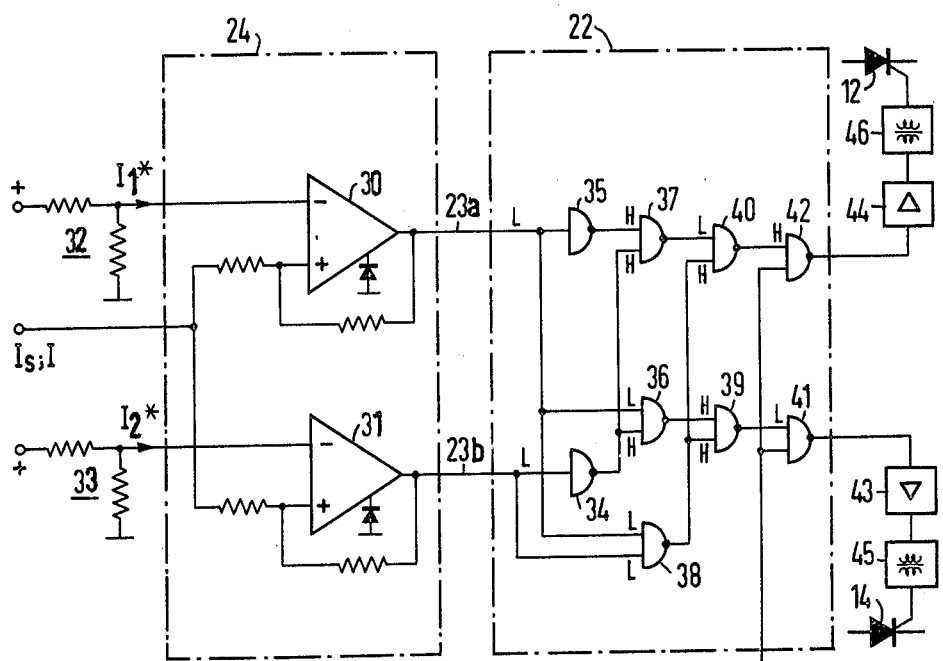
FIG. 4 is a circuit-logic diagram of the comparator and selection circuitry of FIG. 1.

Details of the comparator arrangement 24 and the selection logic 22 of FIG. 1 are shown on the logic-circuit diagram of FIG. 4. The comparator arrangement comprises two comparators 30 and 31 made up of operational amplifiers with positive feedback. The first predetermined value $I_1^*$ is provided as a reference value into the inverting input of the amplifier 30. This value is established by a first voltage divider 32. The second predetermined reference value $I_2^*$ is provided from a second voltage divider 33 to the inverting input of amplifier 31. Both amplifiers have as a common input to appropriate input resistors a value proportional to the actual current I or a desired current $I_S$. Which of these is supplied will depend on the position of the switch 26 shown on FIG. 1. The ratio of the input resistance to the feedback resistance in the amplifiers 30 and 31 determine their hysteresis in well known fashion. Diodes, not specifically labelled are provided at the output of the amplifiers 30 and 31 for clipping purposes to insure that the outputs provided to the selection logic on the lines 23a and 23b from the respective amplifiers cannot go negative.

In the first operating region where I is less than or equal to $I_1^*$, the outputs of both amplifiers will be zero or low indicated as L on the figure. In the second operation region of FIG. 3 where $I_1^*$ is less than I is less than or equal to $I_2^*$, the output of ampplifier 30 will be high and indicated by an H and that of amplifier 31 will remain low. In a third operating region, both amplifiers will have a high or H output on their respective lines 23a and 23b.

The selection logic circuit 22 is made up of a plurality of NAND gates. The nature of an NAND gate is such that if both its inputs are high or H, it will have a low or L output. If either input is low or at the L level, it will have a H output. NAND gates shown with only one connection act as inverters. The illustrated NAND gates are arranged to provide functional operation corresponding to that explained with the schematic illustration of the switch of block 22 in FIG. 1. The circuit is labelled for the condition of operation in the first operating region. As noted above, in this case both lines 23a and 23b will have an L signal thereon. These L signals are provided to respective NAND gate inverters 34 and 35 which, after inversion will both produce H signals at their outputs. Lines 23a and 23b are also provided as inputs to a NAND gate 38. Since two L inputs are present at this NAND gate, it will have an H output. The outputs of gates 34 and 35 are provided as the two inputs to another NAND gate 37. With two H inputs it has an L output. Line 23a is also coupled to a NAND gate 36 having its second input from gate 34.

Since one input is low and one high, it will have a high output. The high output of gate 38 is provided as one input to gate 39 and one input to gate 40. Gate 39 obtains its second input from gate 36 and gate 40 its second input from gate 37. The output of gate 39 is the first input to gate 41 and the output of gate 40 a first input to gate 42. Gates 41 and 42 have as second inputs the line 28 which carries the firing pulse from the pulse generator 21 described in connection with FIG. 1. As noted when describing that figure, a firing pulse will occur only when resistive braking is called for. Thus, gates 41 and 42 insure that when firing pulses do occur, they are directed to the proper thyristors. With the arrangement shown, gate 42 has its first input high and gate 41 its first input low. Upon occurance of a firing pulse, i.e., when the signal on line 28 goes from a low to a high, only a gate 41 or 42 having its other input high will change state going from high to low and back again as the pulse occurs. With the illustrated arrangement, only gate 42 will thus pass the pulse on line 28. This pulse is provided to a pulse amplifier 44 and then to a pulse transformer 46 having its secondary connected to the thyristor 12 of FIG. 1 causing it to fire and bring resistor 11 into the circuit. Thus, proper operation corresponding to operating region 1 takes place. If the current I now increases to where it is between $I_1^*$ and $I_2^*$, the output on line 23a will become an H with that on 23b remaining an L. This will result in gate 38 no longer having two L inputs, with its one input now going to an H, but its output will remain unchanged. The output of gate 35 will now become an L causing the output of gate 37 to go from being an L to being an H. With two H inputs, gate 40 will now have an L output disabling gate 42. The H on line 23a will now cause gate 36 to have two H inputs causing its output to go to an L which will in turn cause the output of gate 39 to go to an H enabling gate 41 so that upon occurance of a firing pulse from circuit 21, that pulse will pass through gate 41 to a pulse amplifier 43 and then through a pulse transformer 45 coupled to fire thyristor 14 resulting in the second resistor 13 being placed in the braking circuit. This corresponds to region 2 operation. Finally, when operating in region 3, the current I will exceed both $I_1^*$ and $I_2^*$ resulting in H outputs on both lines 23a and 23b. That this will result in firing of both thyristors can be seen by examining gate 38. Gate 38 will now have two H inputs causing its output to go to an L. Gates 39 and 40 will respond to this L input and have an H output. Thus, both gates 41 and 42 will be enabled by H outputs to pass the firing pulse to their associated thyristors through their associated amplifiers 43 and 44 and pulse transformers 45 and 46 placing both resistors in the circuit.

Thus, an improved braking circuit for mixed regenerative and resistance braking of a d-c series machine operating as a generator has been shown. Although specific embodiments have been illustrated and described, it will be obvious to those skilled in the art that various modifications may be made without departing from the spirit of the invention which is intended to be limited solely by the appended claims.

What is claimed is:

1. In a braking circuit for the mixed regenerative and resistance braking of a d.c. series machine operating as a generator in which the armature and field windings of said machine are combined with a stabilizing resistor in a series circuit across which is shunted a d.c. control element with a controlled main rectifier and across which is shunted a first braking branch comprising a first braking resistor in series with a first controlled braking rectifier, with the series circuit connected through a return rectifier to a d.c. source which can absorb current at least intermittently, the improvement comprising;

a. means to monitor voltage in the circuit and means responsive thereto to generate firing pulses;
 b. at least a second braking branch comprising a second braking resistor having a resistance different from that of the first braking resistor in series with a controlled braking rectifier, said second braking branch coupled in parallel with said first braking branch;
 c. a selection circuit having at least three switch positions, selectively closed in response to an input signal and selectively coupling said means generating firing pulses to said first and second controlled braking rectifiers, a first switching position coupling said firing pulses to said first braking rectifier, a second switching position coupling said firing pulses to said second braking rectifier and a third switching position coupling said firing pulses to both said first and second braking rectifiers;
 d. means to develop a signal proportional to the actual current in said braking circuit; and
 e. control means for providing a control signal to said selection circuit, said control having as inputs the output of said means providing a signal proportional to actual current and first and second predetermined limit values, said control means providing an output closing said first switch when said actual value exceeds said first predetermined value, an output closing said second switch when said actual value is between said two predetermined values and an output closing said third switch when said actual value is greater than said second predetermined value.

2. A braking circuit according to claim 1 wherein said controlled braking rectifiers are thyristors.

3. A braking circuit according to claim 1 wherein the resistance of said first and second braking resistors connected in parallel is larger than the resistance of the stabilizing resistor.

4. A braking circuit according to claim 3 wherein the stabilizing resistor is bridged by a switch.

5. A braking circuit according to claim 1 wherein the stabilizing resistor is bridged by a switch.

6. A braking circuit according to claim 1 wherein said means for controlling comprises a comparator circuit having as inputs said first and second predetermined limit values of the braking current and said actual value of the braking current.

7. A braking circuit according to claim 6 wherein said actual value is provided by a current transformer and said desired value by a potentiometer.

8. A braking circuit according to claim 7 wherein the resistance of the stabilizing resistor is selected so that the stability condition (1) $E(n, I) \leq U_{Cmin} + I \cdot R_S$ is met for a predetermined maximum speed $n_{max}$ in a braking current region between a predetermined minimum braking current ($I_{min}$) and a predetermined maximum braking current ($I_{max}$), where E is the generator voltage, $U_{Cmin}$ the minimum voltage at a storage capacitor across the supply input and $R_S$ the resistance of the stabilizing resistor.

9. A braking circuit according to claim 8 wherein the resistance of the second braking resistor is selected so that with both braking resistor connected in parallel, a predetermined maximum limit ($I_{max}$) of the braking current is reached.

10. A braking circuit according to claim 1 wherein the resistance of the stabilizing resistor is selected so that the stability condition (1) $E(n, I) \leq U_{Cmin} + I \cdot R_S$ is met for a predetermined maximum speed $n_{max}$ in a braking current region between a predetermined minimum braking current ($I_{min}$) and a predetermined maximum braking current ($I_{max}$), where $E$ is the generator voltage, $U_{Cmin}$ the minimum voltage at a storage capacitor across the supply input and $R_S$ the resistance of the stabilizing resistor.

11. A braking circuit according to claim 1 wherein the resistance of the second braking resistor is selected so that with both braking resistor connected in parallel, a predetermined maximum limit ($I_{max}$) of the braking current is reached.

* * * * *